United States Patent
Mirchandaney et al.

(10) Patent No.: US 6,505,227 B1
(45) Date of Patent: *Jan. 7, 2003

(54) METHOD AND APPARATUS FOR DISTRIBUTING WORK GRANULES AMONG PROCESSES BASED ON THE LOCATION OF DATA ACCESSED IN THE WORK GRANULES

(75) Inventors: Ravi Prem Mirchandaney, Menlo Park, CA (US); Gary Hallmark, San Carlos, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/238,670

(22) Filed: Jan. 26, 1999

Related U.S. Application Data

(63) Continuation of application No. 08/620,002, filed on Mar. 21, 1996, now Pat. No. 5,892,945.

(51) Int. Cl.[7] ............................................. G06F 9/00
(52) U.S. Cl. ..................... 709/102; 709/100; 709/104
(58) Field of Search ........................... 709/100, 101, 709/102, 103, 104, 201, 202, 205, 217, 224, 227; 707/102, 1, 3, 4, 10

(56) References Cited

U.S. PATENT DOCUMENTS

| | | | |
|---|---|---|---|
| 4,633,387 A | 12/1986 | Hartung et al. | 395/675 |
| 4,980,822 A | 12/1990 | Brantley et al. | 395/412 |
| 5,307,485 A | 4/1994 | Bordonaro | 395/607 |
| 5,325,525 A | 6/1994 | Shan et al. | 395/674 |
| 5,592,671 A | 1/1997 | Hirayama et al. | 395/674 |
| 5,692,182 A | 11/1997 | Desai et al. | 707/2 |
| 5,870,743 A | 2/1999 | Cohen et al. | 707/8 |
| 5,892,945 A * | 4/1999 | Mirchandaney et al. | 709/104 |
| 5,956,704 A | 9/1999 | Gautam et al. | 707/1 |
| 6,112,198 A | 8/2000 | Lohman et al. | 707/3 |
| 6,112,225 A | 8/2000 | Kraft et al. | 709/202 |
| 6,223,182 B1 | 4/2001 | Agarwal et al. | 707/102 |
| 6,240,428 B1 | 5/2001 | Yeung et al. | 707/206 |
| 6,263,331 B1 | 7/2001 | Liu et al. | 707/4 |

* cited by examiner

Primary Examiner—Majid A. Banankhah
(74) Attorney, Agent, or Firm—Hickman Palermo Truong & Becker LLP; Marcel K. Bingham

(57) ABSTRACT

A method and apparatus for distributing work granules of a parent task among processes running on various nodes in a multi-processing computer system is provided. The parent task is divided into work granules of varying sizes based on the location of the data that must be accessed to perform the work granules. At least one process on each of the nodes that will be assisting in the execution of the parent task is initially assigned a work granule based on efficiency considerations. Such efficiency considerations may include, for example, the location of the data to be accessed relative to the process, the current I/O load of the devices on which data to be accessed is stored, and the relative sizes of the various work granules. When a process completes the work granule assigned to it, the process is assigned one of the remaining unassigned work granules. Again the work granule assignment is made based on efficiency considerations. This process continues until all of the work granules have been completed.

33 Claims, 5 Drawing Sheets

METHOD AND APPARATUS FOR DISTRIBUTING WORK GRANULES AMONG PROCESSES BASED ON THE LOCATION OF DATA ACCESSED IN THE WORK GRANULES

This application is continuation of application Ser. No. 08/620,002 filed Mar. 21, 1996, now U.S. Pat. No. 5,892,945.

FIELD OF THE INVENTION

The present invention relates to accessing data in a multi-processing system, and more specifically, to a method and apparatus for distributing work granules to multiple processes within a computer system.

BACKGROUND OF THE INVENTION

To fully utilize the computing power of a multi-processing system, a larger task (a "parent task") may be divided into smaller tasks ("work granules") which are then distributed to processes running on one or more processing nodes. Each node may contain multiple processors and multiple concurrent processes. The process that divides parent tasks into work granules and distributes the work granules to processes on the various processing nodes is referred to herein as the coordinator process.

Multi-processing computer systems typically fall into three categories: shared everything systems, shared disk systems, and shared nothing systems. The constraints placed on the coordinator process during the work granule distribution process vary based on the type of multi-processing system involved.

In shared everything systems, processes on all processors have direct access to all dynamic memory devices (hereinafter generally referred to as "memory") and to all static memory devices (hereinafter generally referred to as "disks") in the system. Consequently, a coordinator process in a shared everything system has few constraints with respect to how work granules may be assigned. However, a high degree of wiring between the various computer components is required to provide shared everything functionality. In addition, there are scalability limits to shared everything architectures.

In shared disk systems, processors and memories are grouped into nodes. Each node in a shared disk system may itself constitute a shared everything system that includes multiple processors and multiple memories. Processes on all processors can access all disks in the system, but only the processes on processors that belong to a particular node can directly access the memory within the particular node. Shared disk systems generally require less wiring than shared everything systems. However, shared disk systems are more susceptible to unbalanced workload conditions. For example, if a node has a process that is working on a work granule that requires large amounts of dynamic memory, the memory that belongs to the node may not be large enough to simultaneously store all required data. Consequently, the process may have to swap data into and out of its node's local memory even though large amounts of memory remain available and unused in other nodes.

In shared nothing systems, all processors, memories and disks are grouped into nodes. In shared nothing systems as in shared disk systems, each node may itself constitute a shared everything system or a shared disk system. Only the processes running on a particular node can directly access the memories and disks within the particular node. Of the three general types of multi-processing systems, shared nothing systems typically require the least amount of wiring between the various system components. However, shared nothing systems are the most susceptible to unbalanced workload conditions. For example, all of the data to be accessed during a particular work granule may reside on the disks of a particular node. Consequently, only processes running within that node can be used to perform the work granule, even though processes on other nodes remain idle.

To more evenly distribute the processing workload in a shared nothing system, the data can be redistributed such that the data that must be accessed for a particular parent task will be evenly distributed among many nodes. However, when data is redistributed to spread the data evenly between nodes based on one criteria, the redistribution may distribute the data unevenly based on another criteria. Therefore, a redistribution optimized for one parent task may actually decrease the performance of other parent tasks.

Databases that run on multi-processing systems typically fall into two categories: shared disk databases and shared nothing databases. A shared disk database expects all disks in the computer system to be visible to all processing nodes. Consequently, a coordinator process in a shared disk database may assign any work granule to a process on any node, regardless of the location of the disk that contains the data that will be accessed during the work granule. Shared disk databases may be run on both shared nothing and shared disk computer systems. To run a shared disk database on a shared nothing computer system, software support may be added to the operating system or additional hardware may be provided to allow processes to have direct access to remote disks.

A shared nothing database assumes that a process can only access data if the data is contained on a disk that belongs to the same node as the process. Consequently, a coordinator process in a shared nothing database can only assign a work granule to a process if the data to be processed in the work granule resides on a disk in the same node as the process. Shared nothing databases may be run on both shared disk and shared nothing multi-processing systems. To run a shared nothing database on a shared disk machine, a mechanism may be provided for logically partitioning the disks so that each of the disks is assigned to a particular node.

When run on a shared nothing computer system, the different types of databases experience different types of problems. For example, a shared nothing database is not able to distribute the work granules of a parent task to processes spread evenly between nodes when the data that will be accessed during the parent task (the "accessed data") is not evenly distributed among the nodes. Consequently, a process on a node within which resides a large portion of the data for a parent task may work a long period of time on a large work granule while processes on other nodes remain dormant after having completed small work granules. In addition, load skew may result when multiple processes are already executing on a node on which resides the data to be accessed in a large work granule.

The workload distribution within a shared nothing database system may become even more skewed as a consequence of component failure. Specifically, the processing nodes of a shared nothing system are often grouped so that each given node has a companion node that will assume the responsibilities of the given node if the given node fails. Thus, when the processing or memory component of a node fails, processes on the companion node of the failed node must perform all work granules that access data on disks of the failed node as well as all work granules that access disks that belong to itself. Assuming that work granules were distributed evenly among a set of nodes in an initial distribution, the fact that processes on the companion node of the failed node must perform twice the work of processes on the other nodes significantly skews the workload distribution.

Shared disk databases have the disadvantage that the coordinator process may assign a work granule that may be performed more efficiently by a process on one node to a process on another node. Specifically, in a shared nothing computer system, the amount of time required for a process within a node to access data on a disk within the same node (a "local access") is significantly less than the amount of time required for the same process to access data on a disk within another node (a "remote access"). However, under the assumption that processes on all nodes have equal access to all disks, the coordinator process in a shared database may assign a work granule that accesses data in a first node to a process running on a second node even if a process on the first node is available to perform the work granule.

Based on the foregoing, it is desirable to provide a system in which work granules are assigned to processes in a way that distributes the work of a parent task evenly and efficiently. It is further desirable to be able to assign to a process on a first node a work granule that accesses data on a second node if the second node is busy executing other processes, and to assign the work granule directly to a process on the second node if the second node is not busy executing other processes.

SUMMARY OF THE INVENTION

A method and apparatus for distributing work granules of a parent task among processes on various nodes in a multi-processing computer system is provided. The parent task is divided into work granules of varying sizes based on the location of the data that must be accessed to perform the work granules. Each of the processes that will be assisting in the execution of the parent task is initially assigned a work granule based on efficiency considerations. Such efficiency considerations may include, for example, the location of the data to be accessed relative to the process, the current I/O load of the devices on which data to be accessed is stored, and the relative sizes of the various work granules. When a process completes the work granule assigned to it, it is assigned one of the remaining unassigned work granules. The assignment of subsequent work granules is made based on efficiency considerations. This process continues until all of the work granules have been completed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A system and method are provided for efficiently dividing parent tasks into work granules and efficiently distributing the work granules among processes executing on the nodes in a multi-processing system. In the preferred embodiment, the coordinator process takes into account a variety of factors when determining which processes will be assigned which work granules. Examples of the type of factors considered by the coordinator process include workload distribution, locality of data, I/O load distribution, and work granule granularity. Each of these exemplary factors is described in greater detail below.

The coordinator process assumes that a process on any node may be assigned any work granule, even if the data to be accessed during the work granule is on a disk that belongs to another node. Thus, the work granule coordinator system described herein can be used in shared everything computer systems, shared disk computer systems, and shared nothing computer systems that include a mechanism that provides support for remote disk accesses.

Factors Considered in Work Granule Assignment

WORKLOAD DISTRIBUTION: The power of multi-processing systems stems from the fact that many processors can be working in parallel on the same task. This power would be wasted if all work is assigned to a process running on a single node within the system, while processes on the other nodes remained idle. In general, the more evenly work is distributed, the greater the benefit derived from the parallelism provided by the system architecture. The more skewed the workload distribution, the less efficient the use of the multi-processing system. Ideally, work granules are distributed so all processes working on the work granules of the same parent task will complete their work granules at the same time.

LOCALITY OF DATA: The time it takes for a process on a particular node to access a particular set of data depends on the location of the data with respect to the node. In general, the closer the data is to the processors in a node, the less time and system overhead it will take for processes running on the processors to access the data. Typically, access times follow the following order: local cache memory, local dynamic memory, local disk, remote disk, and remote cache memory, where accessing data that resides in local cache memory provides the fastest access time and accessing data that initially resides in remote cache memories provides the slowest access times. Ideally, work granules are distributed so that work granules that require access to data are assigned to processes on the nodes that have the fastest access to the data.

Figure 1A:
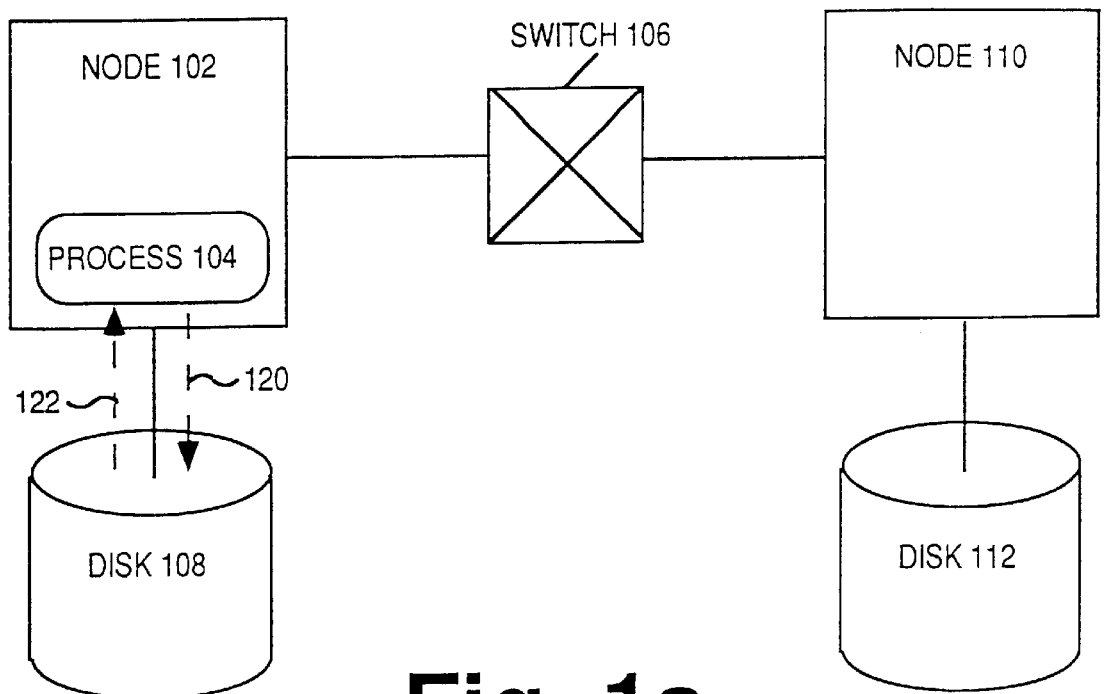
FIG. 1a illustrates a local disk access in a multi-processing system.
Figure 1B:
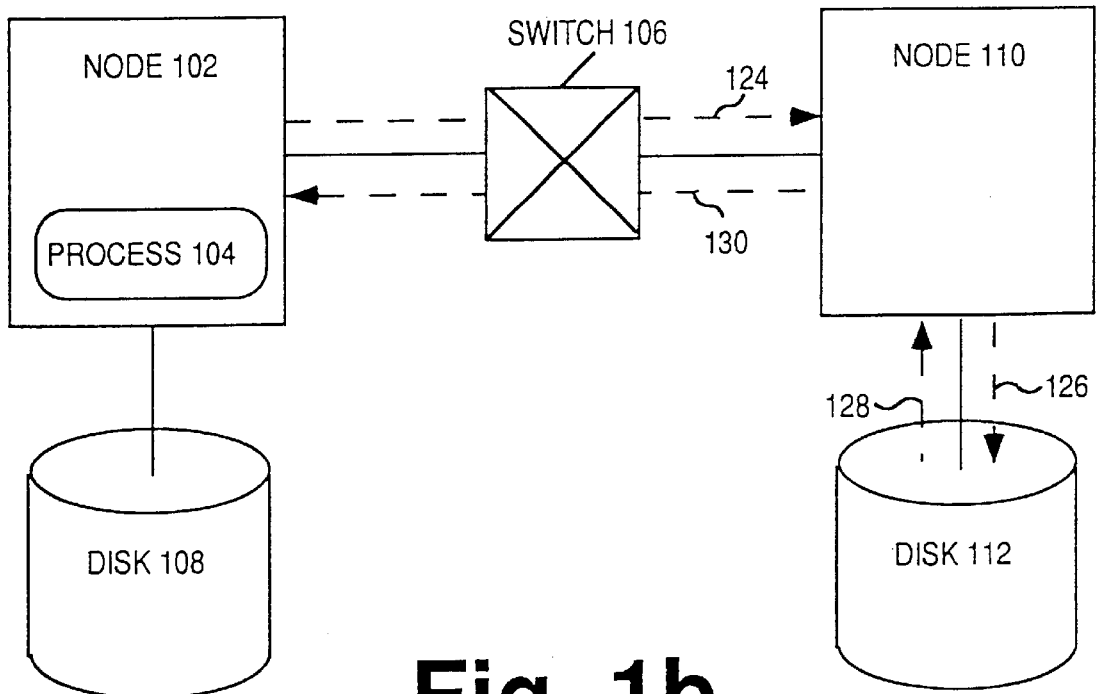
FIG. 1b illustrates a remote disk access in a shared nothing multi-processing system.

The actions required for local and remote disk accesses are shown in FIGS. 1a and 1b, respectively. In FIG. 1a, a process 104 on a node 102 reads data from a local disk 108 by requesting the data (illustrated by arrow 120). In response to the request, the data is transferred from the disk to the process (illustrated by arrow 122). In FIG. 1b, the process 104 reads data from a remote disk 112 by transmitting a request to the remote node 110 to which the disk 112 is assigned. The request, illustrated by arrow 124 must be communicated through an inter-node communication mechanism (shown as switch 106). In response to the request, the node 110 that received the request transmits a request (illustrated by arrow 126) for the data to disk 112. The data is then transferred to node 110 (illustrated by arrow 128). Finally, the data is transmitted from node 110 to process 104 (illustrated by arrow 130).

Figure 2:
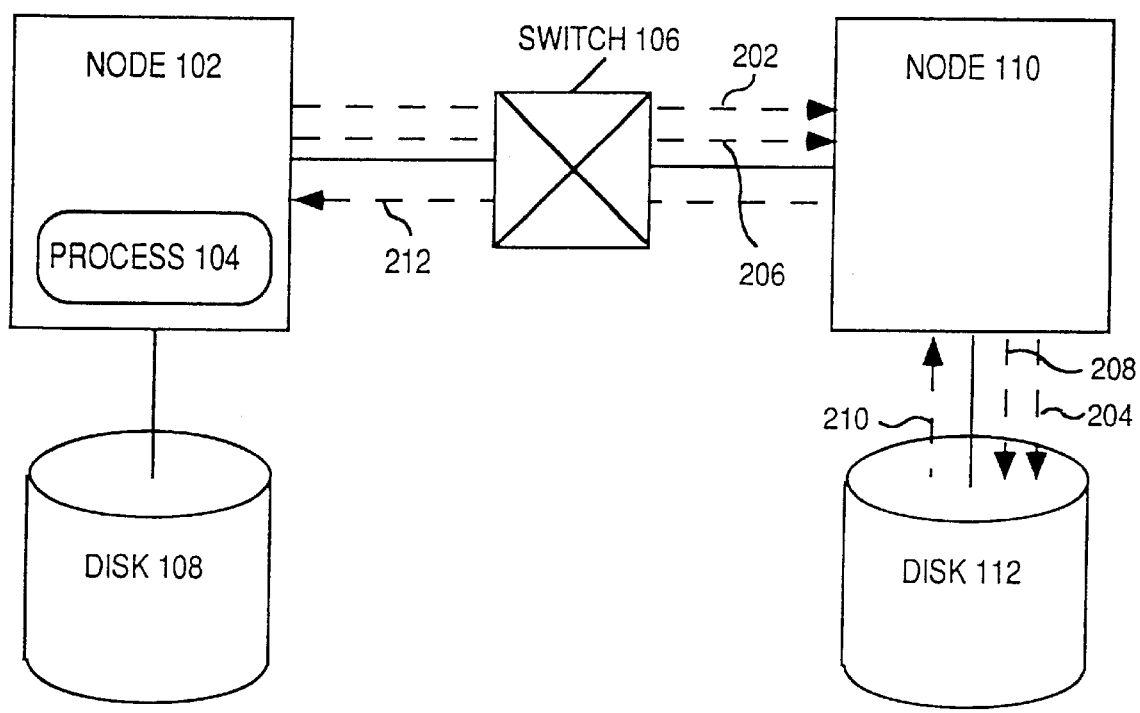
FIG. 2 illustrates access to data that is currently stored in the cache of a remote node of a multi-processing system.

Requesting access to data when an updated copy of the data to be accessed is currently stored in the cache of a remote node is referred to as "pinging". Pinging has an even longer access time than accessing data on a remote disk. FIG. 2 illustrates the operations that must be performed to access data under these conditions. In FIG. 2, the process 104 transmits a request (arrow 202) to the remote node 110 to which the disk 112 is assigned. The node 110 that received the request detects that an updated copy of the requested data resides in its cache. The node 110 writes the updated data to disk 112 (arrow 204). The process 104 requests to read the newly written data (arrow 206). The node 110 transmits a request (illustrated by arrow 208) for the data to disk 112. The data is then transferred to node 110 (illustrated by arrow 210). Finally, the data is transmitted from node 110 to process 104 (illustrated by arrow 212). It should be noted that the updated data could be transmitted to the requesting node without first writing the updated data to disk. However, this practice renders the updates difficult or impossible to recover in the case of a crash.

In shared disk systems, the concept of remote and local disks does not apply. However, even in shared disk systems, pinging conditions may occur. Therefore, in shared disk systems, access times follow the order: local cache memory, disk, and remote cache memory, where local cache memory provides the fastest access rate and remote cache memories provide the slowest access rate.

I/O LOAD DISTRIBUTION: Due to hardware constraints, the overall throughput of a disk may decrease dramatically if the disk is required to simultaneously supply data from two or more different locations on the disk. The performance decrease is due to the fact that the head on the disk must move to the location of the data before the data can be accessed. When data are accessed from two different locations on the same disk, the head of the disk moves back and forth between the two locations. During the intervals in which the head is moving between locations, no data is being read. Therefore, it is preferable that work granules are distributed in such a way that at any given time, only one assigned work granule will require access any given disk.

WORK GRANULE GRANULARITY: To ensure a relatively evenly-distributed workload, coordinator processes typically divide a parent task into more work granules than the number of processes that will be working on the parent task. Initially, each of the processes that will be working on the work granules is assigned one work granule. When a process completes the initial work granule that it was assigned, the process informs the coordinator process that the process is available to receive another work granule. The coordinator process then assigns the process one of the remaining work granules. Consequently, a process that finishes early will not remain idle while the other processes complete their respective work granules.

Unfortunately, this delayed assignment technique can lead to inefficient results in certain situations. For example, assume that four processes are working on work granules of a given parent task, that all four processes are near completion, and that one large work granule remains to be assigned. The first of the four processes to finish its current work granule will be assigned the large remaining work granule. The other three processes will complete their work granules long before the early finisher completes its second work granule. To avoid such situations, the larger work granules are preferably assigned before the smaller work granules. The policy of assigning larger work granules before smaller work granules decreases the workload disparity between the finishing times of the various processes working on work granules from the same parent task.

The Work Granule Coordination Process

Figure 3:
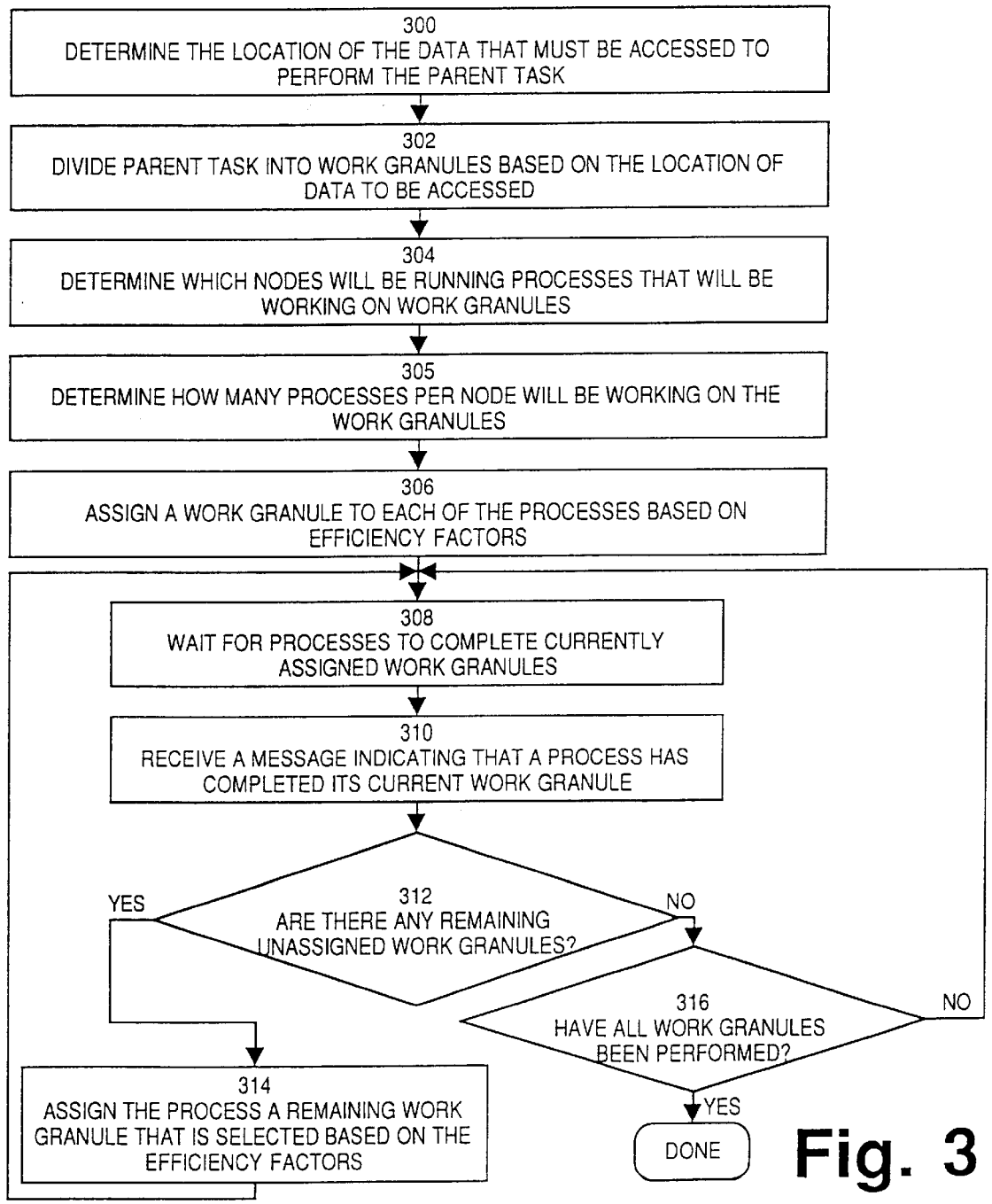
FIG. 3 is a flow chart illustrating the steps for assigning work granules among processes on a set of nodes according to an embodiment of the invention.

FIG. 3 is a flow chart that illustrates the general steps performed by a coordinator process according to an embodiment of the present invention. Referring to FIG. 3, the coordinator process initially determines the location of the data that will be accessed during execution of the parent task. Numerous approaches may be taken to perform this step. For example, a process may issue a series of queries about the location of disk devices and files to the mechanism that is providing shared disk functionality (e.g. the operating system). Based on the answers to the queries, the process may create a virtual map of the underlying multi-processing system and data. Upon receiving a request for execution of a task that requires access to data, the coordinator process consults the virtual map to determine the location of the devices on which the accessed data is stored.

In a database system, the task request may be in the form of a query that operates on tables of data. The coordinator process inspects the query to determine the tables that must be accessed to perform the work task, and inspects the virtual map to determine the location of the devices on which the appropriate tables are stored.

In an alternative approach to step 300, a virtual map of the system is not constructed. Rather, the coordinator process queries the shared disk mechanism separately for each task. For example, if a task requires access to five tables, the coordinator process performs step 300 by requesting the location of the five tables from the shared disk mechanism.

According to yet other approaches, a user may manually construct a virtual map of the system, or may specify in the task request the location of the data that will be accessed. The various approaches to determining the location of data that must be accessed during a task that are enumerated above are merely exemplary. The present invention is not limited to any particular technique for determining the location of data that will be accessed during the execution of a particular task.

When the location of data that will be accessed during the parent task has been determined, control passes to step 302. At step 302, the coordinator process divides the parent task into work granules and sorts the work granules based on the location of data to be accessed. Preferably, the parent task is divided such that each work granule will only require access to a single storage device. Further, it is desirable to create work granules of varying sizes so that the work granule granularity considerations described above may be applied. A mechanism for generating work granules based on a query issued to a database system is described in U.S. patent application Ser. No. 08/127,585 entitled "Method and Apparatus for Parallel Processing in a Database System", filed on Sep. 27, 1993 by Gary Hallmark and Daniel Leary.

Figure 4:
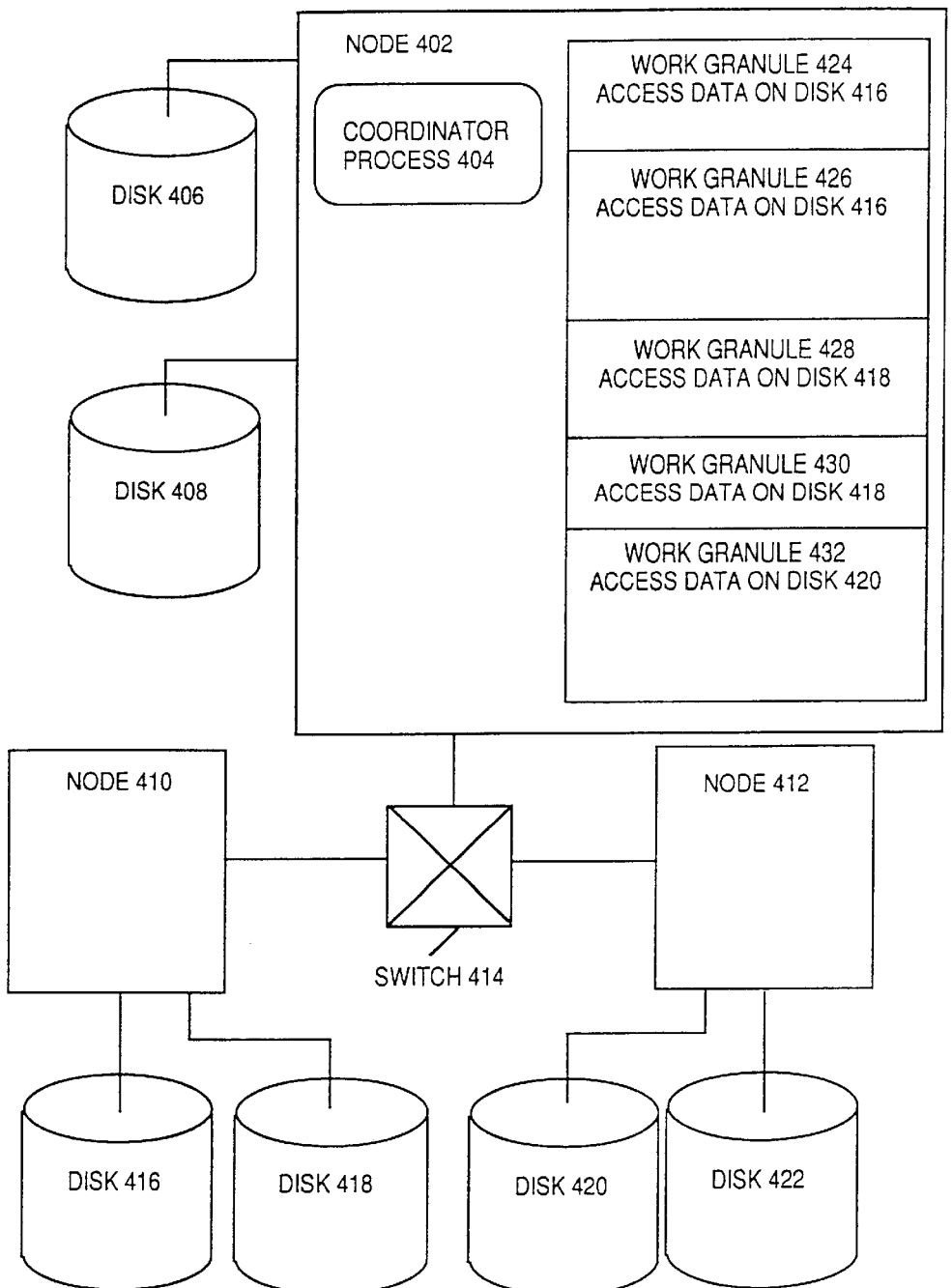
FIG. 4 is a block diagram of an exemplary shared nothing multi-processing system.

FIG. 4 is a block diagram of a coordinating system 400 configured according to an embodiment of the invention. The illustrated system 400 includes three nodes 402, 410 and 412 connected through a switch 414. Switch 414 generally represents the shared disk mechanism that allows the various nodes 402, 410 and 412 to access data on disks that belong to remote nodes. Node 402 is connected to two disks 406 and 408 and is executing a coordinator process 404. Node 410 is connected to two disks 416 and 418, and node 412 is connected to two disks 420 and 422.

Pursuant to step 302, coordinator process 404 has divided a parent task into a plurality of work granules 424–432. Work granules 424 and 426 require access to data stored on disk 416. Work granules 428 and 430 require access to data stored on disk 418. Work granule 432 requires access to data on disk 420. Work granules 426 and 432 represent large work granules, work granules 424, 428 are medium size work granules, and work granule 430 is a small work granule.

At step 304, the coordinator process 404 determines which and how many nodes will be executing processes to perform the work granules. At step 305, the coordinator process 404 determines how many processes per node will be working on the work granules. Various factors may be involved in determining how many nodes and processes to use to perform the work granules of a given parent task. For example, the optimal number of processes may vary based on whether the parent task is I/O intensive (will require heavy access to disks relative to the amount of computations to be performed) or processing intensive (will require large amounts of computations relative to the amount of data accessed).

In database systems, a parent task typically corresponds to a database query. By inspecting the predicate of the query, a query optimizer can estimate whether the corresponding work granule will be processing intensive or I/O intensive based on factors such as the number of I/O operations required to process the query, the amount of data that will be generated by the query, the amount of processing required to generate the data that will be produced, and the I/O bandwidth of the devices that store the data that will be accessed.

If the work granule is I/O intensive, then the coordinator process may establish the number of processes to be equal to the number of disks that will be accessed. With one process working on each disk at all times, the full bandwidth of the disks may be utilized. Under these conditions, little benefit would be gained by assigning work granules to additional processes, since the I/O performance decline that would result from having two processes access the same disk could more than offset any efficiency gain caused by increased parallelism. On the other hand, if the parent task is processing intensive, it may be desirable to increase the number of processes working on the work granule so that each available processor on each available node is executing a process that is working on a work granule of the parent task.

Other factors that may be considered when selecting the nodes and processes that will work on a work granule include the location of the data that will be accessed during the work granule, and the current workload of the processes on the various nodes. As a general policy, it is preferable to assign work granules to processes on the nodes that contain the disks that have the data that will be accessed during the work granules. Further, it is desirable to assign work granules to processes on nodes that do not already have a heavy workload. For the purpose of explanation, it shall be assumed that coordinator process 404 has determined that processes on nodes 410 and 412 will be working on work granules 424 to 432.

At step 306, a work granule is assigned to each of the processes that will be working on the work granule. The coordinator process makes the assignments based on efficiency considerations such as those described above. The actual weight given to each efficiency consideration may vary from implementation to implementation. An exemplary assignment determination process shall be described in greater detail below with reference to FIG. 5.

At step 308, the coordinator process waits for the processes to complete their assigned work granules. When a process completes a particular work granule, the coordinator process receives a message that indicates that the particular work granule has been completed (step 310). The receipt of this signal indicates to the coordinator process that the process that had been assigned the work granule is available to perform more work.

At step 312, the coordinator process determines whether there are any remaining unassigned work granules. If any work granules have not been assigned, the coordinator process selects one of the remaining work granules and assigns the selected work granule to the process that has become available (step 314). Control then passes back to step 308, where the coordinator process waits for the next process to finish its work granule.

When selecting which of the remaining work granules to assign to an available process, the coordinator process takes into account efficiency considerations such as those described above. For example, the coordinator process may make the assignment determination using the process illustrated in FIG. 5, which shall be described below.

If no work granules remain unassigned, then control passes from step 312 to step 316. At step 316, it is determined whether all of the processes that are working on work granules for the particular parent task have completed the work granules that they have been assigned. If all of the processes have completed their work granules, then the work granule distribution process is done. Otherwise, control passes back to step 308 where the coordinator process waits for the remaining processes to complete.

Exemplary Assignment Determination Process

Figure 5:
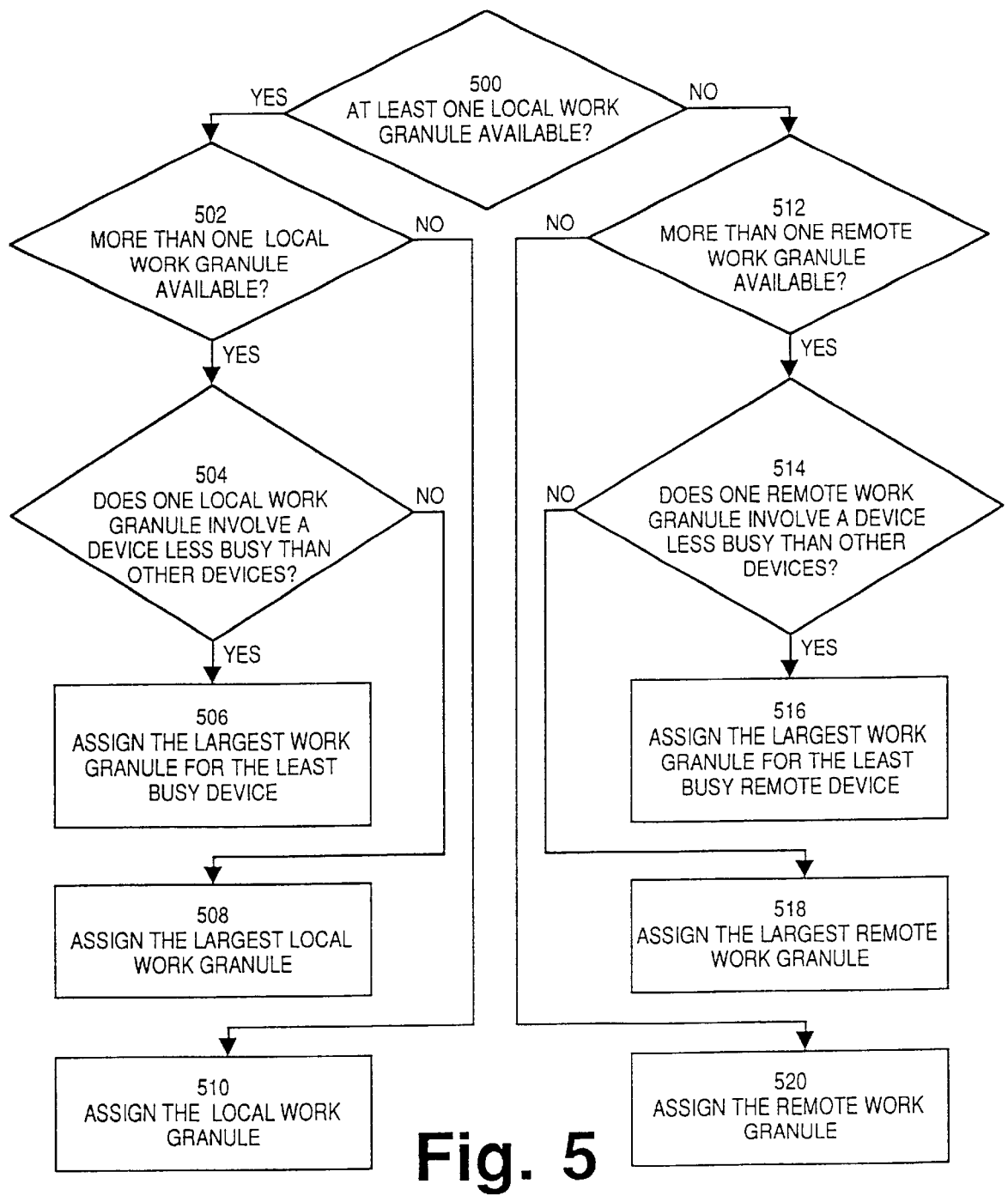
FIG. 5 is a flow chart illustrating the steps for determining which work granule to assign a process on a given node according to an embodiment of the invention.

Referring to FIG. 5, it is a flow chart illustrating an exemplary assignment determination process. These steps may be performed both to assign initial work granules to processes, and to assign subsequent work granules to processes when the processes complete the work granules on which they are currently working. At step 500, the coordinator process determines whether at least one local work granule is available. A local work granule is a work granule that requires access to a device that belongs to the node that is running the process to which the work granule is being assigned. If at least one local work granule has not yet been assigned, control passes to step 502. Otherwise, control passes to step 512.

At step 502, it is determined whether more than one local work granule is available. If only one local work granule is available, then the process is assigned the one local work granule at step 510. If more than one local work granule is available, then control passes to step 504. At step 504, it is determined whether one of the available local work granules involves a device that is less busy than other local devices. For example, assume that it is being determined which work granule to assign to a process running on node 410. Work granules may be available for both disk 416 and disk 418. However, a process on node 412 may currently be assigned a work granule that requires access to disk 416, while no processes are currently assigned work granules that access disk 418. Under these conditions, disk 418 will be "less busy" than disk 416. Therefore, it is more efficient to assign to the process on node 410 the work granule that requires access to disk 418.

If no local work granule involves a device that is less busy than other local devices, then the process is assigned the largest local work granule at step 508. Otherwise, the process is assigned the largest work granule for the least busy device at step 506. In the example given above, the process on node 410 would be assigned the largest work granule that requires access to disk 418.

If no local work granules are available, control passes from step 500 to step 512. At step 512, it is determined whether more than one remote work granule is available. If only one remote work granule is available, then the process is assigned the one remote work granule at step 520. If more than one remote work granule is available, then control passes to step 514. At step 514, it is determined whether one of the available remote work granules involves a device that is less busy than other remote devices. If no remote work granule involves a device that is less busy than other remote devices, then the process is assigned the largest remote work granule at step 518. Otherwise, the process is assigned the largest work granule for the least busy remote device at step 516.

It should be noted that the exemplary work granule assignment determination process illustrated in FIG. 5 takes into account the efficiency factors enumerated above. Specifically, a relatively even workload distribution is obtained by assigning work granules to processes as the processes become available to take on new work granules. In light of locality of data considerations, processes are assigned work granules that require access to local disks unless there are no such work granules remaining. With respect to I/O load distribution, work granules that involve the least busy devices are assigned before work granules that involve devices that are under heavy use. With respect to work granule granularity, larger work granules are assigned before smaller work granules.

The illustrated work granule assignment determination process gives a different weight to each of the various efficiency factors. For example, workload distribution is given greater weight than data locality in that the coordinator process will assign a work granule to a process that will be required to perform a remote access rather than waiting to assign the work granule to a currently-busy process running on the node in which the data resides. In addition, locality of data is given more weight than I/O workload distribution in that the coordinator process will assign to a process a local work granule that requires access to a busy disk rather than assign the process a work granule that requires access to an idle remote disk. When a process is assigned a work granule that requires access to locally-stored data, the likelihood is increased that a copy of the data will be in a cache that is local to the process.

It should be noted that the weight given to each efficiency factor may vary from implementation to implementation. More sophisticated coordinator processes may involve complex weighting schemes, where a first factor is generally given more weight than second factor, but may be outweighed by the second factor under certain conditions. For example, a coordinator process may be configured to assign local work granules before remote work granules unless all of the available local work granules require access to disks that are currently being accessed by more than two processes. The present invention is not limited to systems that give any particular combination of relative weights to the various efficiency factors involved in the work granule assignment process.

Returning to the exemplary system illustrated in FIG. 4, it shall be assumed that coordinator process 404 is configured to assign work granules 424–432 to processes on nodes 410 and 412 according to the assignment process illustrated in FIG. 5. Based on the illustrated assignment steps, coordinator process 404 would initially assign work granule 426 to a process on node 410 and work granule 432 to a process on node 412 because work granules 426 and 432 are the largest local work granules for the respective nodes.

Assume that the process on node 412 completes work granule 432 before the process on node 410 completes work granule 426. Coordinator process 404 would then assign work granule 428 to the process on node 412. Work granule 428 would be selected because no local work granules remain, disk 418 is less busy than disk 416, and work granule 428 is larger than work granule 430.

Assume that the process on node 410 then completes work granule 432. The coordinator process 404 would then assign work granule 424 to the process on node 410. Work granule 424 would be selected because work granule 424 requires access to a disk 416 that is less busy than the disk 418 that must be accessed by the other remaining work granule 430.

When node 412 completes work granule 428, the coordinator process 404 would assign the only remaining work granule (work granule 430) to the process on node 412. It should be noted that the last work granule to be assigned to any process is a small work granule. Consequently, the time interval between the time in which the processes finish their last assigned work granules is generally shorter than would be the case if the last work granule to be assigned was a large work granule.

Work Granule Assignment in Shared Disk Systems

As explained above, processes on all nodes have equal access to all disks in shared disk systems. However, the access rate experienced by processes on a particular node is still affected by the location of the data that the processes are attempting to access. Specifically, a process has the fastest access to data that is stored in the cache memory of the node on which it is running. Accessing data that is stored on a disk takes longer than accessing data that is already cached. Accessing data when an updated version of the data resides in the cache of a different node results in the slowest access rate. Thus, an attempt to access data when an updated version of the data resides in the cache of a different node is the shared disk equivalent to a "remote access".

As in shared nothing systems, the work granule assignment process in a shared disk system involves assigning to each process the work granule that requires access to the data that is most efficiently accessed by the process. Thus, the coordinator process would assign to a process on a node a work granule that operates on data that is already stored in the cache of the node rather than a work granule that operates on data that is stored on disk. Similarly, the coordination process would assign to a process on a node a work granule that requires access to data stored on disk rather than a work granule that operates on data stored in the cache of another node. Other efficiency considerations (e.g., I/O load distribution and work granule granularity) also apply equally to both shared disk and shared nothing systems.

In shared disk systems, the step of determining the location of data that must be accessed to perform the parent task (step 300 of FIG. 3) involves determining which sets of data to be accessed are currently cached in nodes, and in which nodes the various sets of data are cached. Various approaches may be used to acquire this information. According to one approach, data that will be accessed during a parent task is divided into partitions, and work granules are grouped into granule groups that correspond with the data partitions. The work granules are initially distributed such that processes on no more than one node are working on work granules from any given granule group. When a process finishes a work granule from a particular granule group, the process is assigned another work granule from the same granule group. According to another approach, a mechanism may be provided that tracks the contents of the dynamic memories in the various nodes. When a process finishes a work granule, the process is assigned a work granule that requires access to the data currently stored in the dynamic memory of the node on which it resides.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for assigning work granules from a plurality of work granule that are each currently unassigned, the method comprising the computer implemented steps of:

determining which work granule of said plurality of work granules to assign to a process by
       examining said plurality of work granules, and
       determining that a particular work granule may be executed by a node at least as efficiently, under current conditions within a computer system, as any other work granule from said plurality of work granules; and in response to determining that a particular work granule may be executed by a node at least as efficiently, under current conditions within said computer system, as any other work granule from said plurality of work granules, assigning said work granule to said process.

2. The method of claim 1, wherein the step of determining that a particular work granule may be executed by a node at least as efficiently is performed based on a set of one or more factors, wherein a factor in said one or more factors is whether data that will be accessed during the execution of the particular work granule resides in cache memory that is local relative to said node.

3. The method of claim 1, wherein the step of determining that a particular work granule may be executed by a node at least as efficiently is performed based on a set of one or more factors, wherein a factor in said one or more factors includes whether data that will be accessed during execution of a particular work granule resides on a device that is local relative to said node.

4. The method of claim 1, wherein the step of determining that a particular work granule may be executed by a node at least as efficiently is performed based on a set of one or more factors, wherein a factor in said one or more factors is the relative size of said particular work granule to other work granules from said plurality of work granules.

5. The method of claim 1, wherein the step of determining that a particular work granule may be executed by a node at least as efficiently is performed based on a set of one or more factors, wherein a factor in said one or more factors is whether data that will be accessed during execution of said particular work granule resides on a first non-volatile storage device that is less busy than a second non-volatile storage device on which data resides that will be accessed during execution of another work granule from said plurality of work granules.

6. The method of claim 1, wherein the step of determining that a particular work granule may be executed by a node at least as efficiently is performed based on a set of one or more factors, wherein a factor in said one or more factors is whether data that will be accessed during execution of said particular work granule resides on a first non-volatile storage device and data that will be accessed during the execution of another work granule from said plurality of work granules resides in cache memory of another node.

7. The method of claim 6, wherein the step of determining that a particular work granule may be executed by a node at least as efficiently is performed based on a set of one or more factors, wherein a factor in said one or more factors is whether said data that will be accessed during the execution of said particular work granule resides on a non-volatile storage device and an updated version of said data that will be accessed during the execution of another work granule resides in cache memory while another version of said data that will be accessed during the execution of said other work granule resides on a non-volatile storage device.

8. The method of claim 1, wherein:

said plurality of work granules includes a set of work granules that include said particular work granule, wherein during execution of each of said set of work granules a data partition will be accessed; and wherein the step of determining that a particular work granule may be executed by a node at least as efficiently is performed based on a set of one or more factors, wherein a factor in said one or more factors is whether said process resides on a node with one or more processes that are assigned work granules from said set of work granules before being assigned work granules not from said set of work granules.

9. The method of claim 1, further including the steps of:

receiving a database statement that specifies an operation on data within a database;

dividing said operation into parts to generate said plurality of work granules; and wherein the step of determining which work granule is performed in response to execution of said database statement.

10. A method for determining which work granule of a plurality of work granules to assign to a process running on a node of a computer system, the method comprising the steps of:

identifying, for each work granule of said plurality of work granules before executing said each work granule, data that will be accessed during execution of said each work granule;

determining that the data that will be accessed during the execution of a particular work granule from said plurality of work granules is accessed more efficiently by said process than data that will accessed during the execution of at least one other work granule from said plurality of work granules; and in response to determining that the data that will be accessed during the execution of a particular work granule from said plurality of work granules is accessed more efficiently by said process than the data that will accessed during the execution of at least one other work granule from said plurality of work granules, assigning said particular work granule to said process.

11. The method of claim 10, further including the steps of:
receiving a database statement that specifies an operation on data within a database;
dividing said operation into parts to generate said plurality of work granules; and
wherein the step of determining is performed in response to execution of said database statement.

12. A computer-readable medium carrying one or more sequences of one or more instructions for assigning work granules from a plurality of work granules that are each currently unassigned, the one or more sequences of one or more instructions including instructions which, when executed by one or more processors, cause the one or more processors to perform the steps of:
determining which work granule of said plurality of work granules to assign to a process by
examining said plurality of work granules, and
determining that a particular work granule may be executed by a node at least as efficiently, under current conditions within a computer system, as any other work granule from said plurality of work granules; and
in response to determining that a particular work granule may be executed by a node at least as efficiently, under current conditions within said computer system, as any other work granule from said plurality of work granules, assigning said work granule to said process.

13. The computer-readable medium of claim 12, wherein the step of determining that a particular work granule may be executed by a node at least as efficiently is performed based on a set of one or more factors, wherein a factor in said one or more factors is whether data that will be accessed during the execution of the particular work granule resides in cache memory that is local relative to said node.

14. The computer-readable medium of claim 12, wherein the step of determining that a particular work granule may be executed by a node at least as efficiently is performed based on a set of one or more factors, wherein a factor in said one or more factors includes whether data that will be accessed during execution of a particular work granule resides on a device that is local relative to said node.

15. The computer-readable medium of claim 12, wherein the step of determining that a particular work granule may be executed by a node at least as efficiently is performed based on a set of one or more factors, wherein a factor in said one or more factors is the relative size of said particular work granule to other work granules from said plurality of work granules.

16. The computer-readable medium of claim 12, wherein the step of determining that a particular work granule may be executed by a node at least as efficiently is performed based on a set of one or more factors, wherein a factor in said one or more factors is whether data that will be accessed during execution of said particular work granule resides on a first non-volatile storage device that is less busy than a second non-volatile storage device on which data resides that will be accessed during execution of another work granule from said plurality of work granules.

17. The computer-readable medium of claim 12, wherein the step of determining that a particular work granule may be executed by a node at least as efficiently is performed based on a set of one or more factors, wherein a factor in said one or more factors is whether data that will be accessed during execution of said particular work granule resides on a first non-volatile storage device and data that will be accessed during the execution of another work granule from said plurality of work granules resides in cache memory of another node.

18. The computer-readable medium of claim 12, further including sequences of instructions for performing the steps of:
receiving a database statement that specifies an operation on data within a database;
dividing said operation into parts to generate said plurality of work granules; and
wherein the step of determining is performed in response to execution of said database statement.

19. A computer-readable medium for determining which work granule of a plurality of work granules to assign to a process running on a node of a computer system, the method comprising the steps of:
identifying, for each work granule of said plurality of work granules before executing said each work granule, data that will be accessed during execution of said each work granule;
determining that the data that will be accessed during the execution of a particular work granule from said plurality of work granules is accessed more efficiently by said process than data that will accessed during the execution of at least one other work granule from said plurality of work granules; and
in response to determining that the data that will be accessed during the execution of a particular work granule from said plurality of work granules is accessed more efficiently by said process than the data that will accessed during the execution of at least one other work granule from said plurality of work granules, assigning said particular work granule to said process.

20. The computer-readable medium of claim 19, further including sequences of instructions for performing the steps of:
receiving a database statement that specifies an operation on data within a database;
dividing said operation into parts to generate said plurality of work granules; and
wherein the step of determining is performed in response to execution of said database statement.

21. A computer system for assigning work granules from a plurality of work granules that are each currently unassigned, comprising:
one or more processors;
a memory coupled to the one or more processors, said computer system configured to perform the steps of:
determining which work granule of said plurality of work granules to assign to a process by examining said plurality of work granules, and determining that a particular work granule may be executed by a node at least as efficiently, under current conditions within a computer system, as any other work granule from said plurality of work granules; and
in response to determining that a particular work granule may be executed by a node at least as efficiently, under current conditions within said computer system, as any other work granule from said plurality of work granules, assigning said work granule to said process.

22. The computer system recited in claim 21, wherein the step of determining that a particular work granule may be executed by a node at least as efficiently is performed based on a set of one or more factors, wherein a factor in said one or more factors is whether data that will be accessed during the execution of the particular work granule resides in cache memory that is local relative to said node.

23. The computer system recited in claim 21, wherein the step of determining that a particular work granule may be executed by a node at least as efficiently is performed based on a set of one or more factors, wherein a factor in said one or more factors includes whether data that will be accessed during execution of a particular work granule resides on a device that is local relative to said node.

24. The computer system recited in claim 21, wherein the step of determining that a particular work granule may be executed by a node at least as efficiently is performed based on a set of one or more factors, wherein a factor in said one or more factors is the relative size of said particular work granule to other work granules from said plurality of work granules.

25. The computer system recited in claim 21, wherein the step of determining that a particular work granule may be executed by a node at least as efficiently is performed based on a set of one or more factors, wherein a factor in said one or more factors is whether data that will be accessed during execution of said particular work granule resides on a first non-volatile storage device that is less busy than a second non-volatile storage device on which data resides that will be accessed during execution of another work granule from said plurality of work granules.

26. The computer system recited in claim 21, wherein the step of determining that a particular work granule may be executed by a node at least as efficiently is performed based on a set of one or more factors, wherein a factor in said one or more factors is whether data that will be accessed during execution of said particular work granule resides on a first non-volatile storage device and data that will be accessed during the execution of another work granule from said plurality of work granules resides in cache memory of another node.

27. The computer system recited in claim 26, wherein the step of determining that a particular work granule may be executed by a node at least as efficiently is performed based on a set of one or more factors, wherein a factor in said one or more factors is whether
   said data that will be accessed during the execution of said particular work granule resides on a non-volatile storage device and
   an updated version of said data that will be accessed during the execution of another work granule resides in cache memory while another version of said data that will be accessed during the execution of said other work granule resides on a non-volatile storage device.

28. The computer system recited in claim 27, wherein:
   said plurality of work granules includes a set of work granules that include said particular work granule, wherein during execution of each of said set of work granules a data partition will be accessed; and
   wherein the step of determining that a particular work granule may be executed by a node at least as efficiently is performed based on a set of one or more factors, wherein a factor in said one or more factors is whether said process resides on a node with one or more processes that are assigned work granules from said set of work granules before being assigned work granules not from said set of work granules.

29. The computer system recited in claim 21, wherein the steps further include:
   receiving a database statement that specifies an operation on data within a database;
   dividing said operation into parts to generate said plurality of work granules; and
   wherein the step of determining which work granule is performed in response to execution of said database statement.

30. A computer system for assigning work granules from a plurality of work granules that are each currently unassigned, comprising:
   one or more processors;
   a memory coupled to the one or more processors, said computer system configured to perform the steps of:
      identifying, for each work granule of said plurality of work granules before executing said each work granule, data that will be accessed during execution of said each work granule;
      determining that the data that will be accessed during the execution of a particular work granule from said plurality of work granules is accessed more efficiently by said process than data that will accessed during the execution of at least one other work granule from said plurality of work granules; and
      in response to determining that the data that will be accessed during the execution of a particular work granule from said plurality of work granules is accessed more efficiently by said process than the data that will accessed during the execution of at least one other work granule from said plurality of work granules, assigning said particular work granule to said process.

31. The computer system recited in claim 30, wherein the steps further include:
   receiving a database statement that specifies an operation on data within a database;
   dividing said operation into parts to generate said plurality of work granules; and
   wherein the step of determining is performed in response to execution of said database statement.

32. A computer system for assigning work granules from a plurality of work granules that are each currently unassigned comprising:
   means for determining which work granule of said plurality of work granules to assign to a process by examining said plurality of work granules, and means for determining that a particular work granule may be executed by a node at least as efficiently, under current conditions within said computer system, as any other work granule from said plurality of work granules; and
   means for assigning said work granule to said process in response to determining that a particular work granule may be executed by a node at least as efficiently, under current conditions within said computer system, as any other work granule from said plurality of work granules.

33. A computer system for assigning work granules from a plurality of work granules that are each currently unassigned comprising:
   means for determining which work granule of said plurality of work granules to assign to a process by examining said plurality of work granules, and means for determining that a particular work granule may be executed by a node at least as efficiently, under current conditions within said computer system, as any other work granule from said plurality of work granules; and means for assigning said work granule to said process in response to determining that a particular work granule may be executed by a node at least as efficiently, under current conditions within said computer system, as any other work granule from said plurality of work granules.

* * * * *

UNITED STATES PATENT AND TRADEMARK OFFICE
CERTIFICATE OF CORRECTION

PATENT NO. : 6,505,227 B1
DATED : January 7, 2003
INVENTOR(S) : Michandaney et al.

It is certified that error appears in the above-identified patent and that said Letters Patent is hereby corrected as shown below:

Column 11,
Line 27, replace "granule" with -- granules --;

Column 15,
Line 53, replace "claim 27" with -- claim 21 --.

Signed and Sealed this

Seventh Day of October, 2003

JAMES E. ROGAN
*Director of the United States Patent and Trademark Office*